United States Patent
Okado et al.

(10) Patent No.: US 6,726,853 B2
(45) Date of Patent: Apr. 27, 2004

(54) PROCESS FOR PRODUCING SYNTHETIC GAS EMPLOYING CATALYST FOR REFORMING

(75) Inventors: Hideo Okado, Ushiku (JP); Toshiya Wakatsuki, Funabashi (JP); Kiyoshi Inaba, Ichikawa (JP); Hitomi Hirano, Ichikawa (JP)

(73) Assignee: Sekiyushigen Kaihatsu Kabushiki Kaisha, Tokyo (JP)

( * ) Notice: Subject to any disclaimer, the term of this patent is extended or adjusted under 35 U.S.C. 154(b) by 133 days.

(21) Appl. No.: 10/154,041

(22) Filed: May 21, 2002

(65) Prior Publication Data
US 2002/0183402 A1 Dec. 5, 2002

Related U.S. Application Data

(62) Division of application No. 09/538,346, filed on Mar. 29, 2000.

(30) Foreign Application Priority Data

May 4, 1999 (JP) ............................................ 11-098220

(51) Int. Cl.$^7$ .................................................. C07C 1/02
(52) U.S. Cl. ....................................... 252/373; 423/651
(58) Field of Search ........................... 252/373; 423/651

(56) References Cited

U.S. PATENT DOCUMENTS 3,945,944 A * 3/1976 Kang ......................... 502/259
4,863,712 A * 9/1989 Twigg et al. ................. 423/651

* cited by examiner

Primary Examiner—Stanley S. Silverman
Assistant Examiner—Edward M. Johnson
(74) Attorney, Agent, or Firm—Kolisch Hartwell, P.C.

(57) ABSTRACT

The present invention relates to a catalyst for reforming that is employed when preparing a synthetic gas by reacting hydrocarbon such as methane with a reforming agent such as water, carbon dioxide, oxygen, air or the like. The present invention further relates to a process for producing a synthetic gas employing this catalyst for reforming. By employing the catalyst for reforming that is a mixed oxide having the composition expressed by the following formula in which the M and Co are in a highly dispersed state, it is possible to suppress precipitation of carbonaceous matters (carbon) when producing the synthetic gas.

$$aM.bCo.cMg.dCa.eO$$

(Where, a, b, c, d, and e are molar fractions, $a+b+c+d=1$, $0.0001 \leq a \leq 0.10$, $0.0001 \leq b \leq 0.20$, $0.70 \leq (c+d) \leq 0.9998$, $0 < c \leq 0.9998$, $0 \leq d < 0.9998$, e=the number of oxygen necessary to maintain an electric charge balance with metallic elements. M is at least one type of element selected from among the group VIA elements, group VIIA elements, group VIII transition elements excluding Co, group IB elements, group IIB elements, group IVB elements and lanthanoid elements in the periodic table.)

6 Claims, 1 Drawing Sheet

PROCESS FOR PRODUCING SYNTHETIC GAS EMPLOYING CATALYST FOR REFORMING

CROSS-REFERENCE TO RELATED APPLICATION

This application is a divisional of U.S. patent application Ser. No. 09/558,346, filed Mar. 29, 2000, the disclosure of which is hereby incorporated by reference.

BACKGROUND OF THE INVENTION

1. Field of the Invention

The present invention relates to a catalyst for reforming that is employed when producing synthetic gas by reacting hydrocarbon such as methane with a reforming agent such as water, carbon dioxide, oxygen, air or the like. The present invention further relates to a process for producing synthetic gas employing this catalyst for reforming. The synthetic gas is a mixed gas containing carbon monoxide (CO) and hydrogen ($H_2$).

The present specification is based on a patent application filed in Japan (Japanese Patent Application No. Hei. 11-98220), the contents of which are incorporated herein by reference.

2. Description of the Related Art

It has been the conventional practice to carry out reforming by reacting hydrocarbon such as methane, natural gas, petroleum gas, naphtha, heavy oil, crude oil or the like, and a reforming agent such as water, air, oxygen, or carbon dioxide at high temperature in the presence of a catalyst, to generate a highly reactive synthetic gas. Methanol or liquid fuels are then produced by employing this generated synthetic gas as a source material.

$Ni/Al_2O_3$ catalyst, $Ni/MgO/Al_2O_3$ catalyst or the like may be applied as examples of reforming catalysts used in reforming reactions.

However, when stoichiometric equivalents of methane and steam are reacted during reforming employing these types of catalysts for reforming, for example, a problem arises in that considerable deposition of carbonaceous matters (carbon) occurs. Accordingly, in order to prevent deposition of this carbonaceous matters, a large excess of steam is supplied to the reactor, to accelerate the reforming reaction.

As a result, reforming reactions as conventionally performed requires a large amount of steam, leading to such undesirable consequences as increased energy costs and larger facilities.

SUMMARY OF THE INVENTION

It is the objective of the present invention to prevent the deposition of carbonaceous matters when producing synthetic gas by adding a stoichiometric equivalent, or an amount near the stoichiometric equivalent, of a reforming agent to hydrocarbon.

This subject can be resolved by employing a compound that is a mixed oxide having the composition expressed by the following formula in which M and Co are more highly dispersed as the catalyst for reforming.

$$aM.bCo.cMg.dCa.eO$$

(Where, a, b, c, d, and e are molar fractions, $a+b+c+d=1$, $0.0001 \leq a \leq 0.10$, $0.0001 \leq b \leq 0.20$, $0.70 \leq (c+d) \leq 0.9998$, $0 < c \leq 0.9998$, $0 \leq d < 0.9998$, and e=the number of oxygen necessary to maintain an electric charge balance with metallic elements. M is at least one type of element selected from among the group VIA elements, group VIIA elements, group VIII transition elements excluding Co, group IB elements, group IIB elements, group IVB elements and lanthanoid elements in the periodic table.)

The present invention employs as the catalyst for reforming the mixed oxide in which M and Co are more highly dispersed. As a results even when reacting the stoichiometric equivalent, or an amount near the stoichiometric equivalent, of the hydrocarbon and the reforming agent, it is possible to suppress deposition of carbonaceous matters (carbon). Accordingly, the synthetic gas can be obtained with high efficiency, and production costs can be reduced. Moreover, the catalyst is not contaminated by the carbonaceous matters, so that deterioration in catalytic activity over time is prevented, and the life of the catalyst can be extended.

DESCRIPTION OF THE PREFERRED EMBODIMENTS

Figure 1:
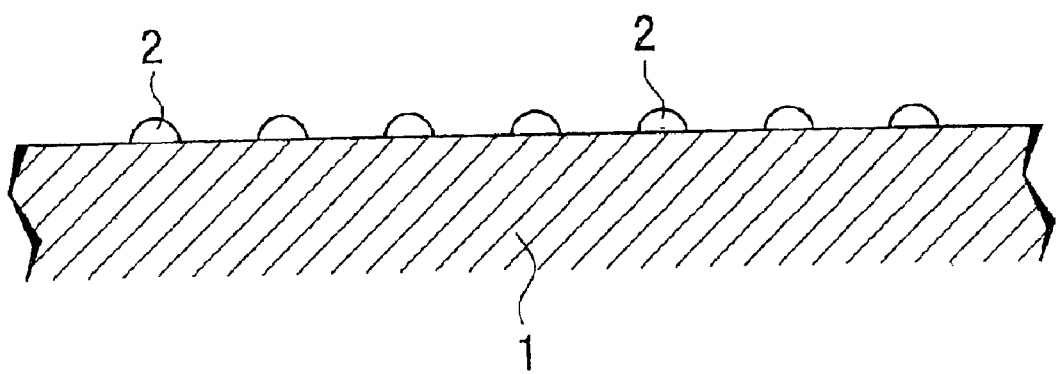
FIG. 1 is an explanatory figure schematically showing the surface condition of the catalyst in the present invention.

The present invention will now be described in detail.

The present invention's cobalt-type catalyst for reforming shall be explained first.

The present invention's cobalt-type catalyst for reforming comprises of a mixed oxide having the composition expressed by the formula below. The composition here is expressed as an anhydride basis after calcination.

$$aM.bCo.cMg.dCa.eO$$

(Where, a, b, c, d, and e are molar fractions, $a+b+c+d=1$, $0.0001 \leq a \leq 0.10$, $0.0001 \leq b \leq 0.20$, $0.70 \leq (c+d) \leq 0.9998$, $0 < c \leq 0.9998$, $0 \leq d < 0.9998$, e=the number of oxygen necessary to maintain an electric charge balance with metallic elements. M is at least one type of element selected from among the group VIA elements, group VITA elements, group VIII transition elements excluding Co, group TB elements, group IIB elements, group IVB elements and lanthanoid elements in the periodic table.)

Note that the periodic table cited here is based on the IUPAC.

It is preferable that M be at least one element selected from the group comprising manganese, rhodium, ruthenium, platinum, palladium, zinc, lead, lanthanum, and cerium. In this composition, the M content (a) is $0.0001 \leq a \leq 0.10$, preferably $0.0001 \leq a \leq 0.05$, and even more preferably $0.0001 \leq a \leq 0.03$. When the M content (a) is less than 0.0001, then the effect of suppressing deposition of the carbonaceous matters is not sufficient. When the M content (a) exceeds 0.10, there is an undesirable drop in the activity of the reforming reaction.

The cobalt content (b) is $0.0001 \leq b \leq 0.20$, preferably $0.0001 \leq b \leq 0.15$, and even more preferably $0.0001 \leq b \leq 0.10$. When the cobalt content (b) is less than 0.0001, then the content of cobalt is too small and the activity of reactions falls. When the content exceeds 0.20, the higher dispersion of cobalt described below is hindered, and the deposition of the carbonaceous matters cannot be sufficiently suppressed.

The total amount (c+d) of the magnesium content (c) and the calcium content (d) is $0.70 \leq (c+d) \leq 0.9998$, preferably $0.85 \leq (c+d) \leq 0.9998$, and even more preferably $0.90 \leq (c+d) \leq 0.9998$. Of this total amount, the magnesium content (c) is $0 < c \leq 0.9998$, preferably $0.35 \leq c \leq 0.9998$, and even more preferably $0.6 \leq c \leq 0.9998$, while the calcium content (d) is $0 \leq d < 0.9998$, preferably $0 \leq d \leq 0.5$, and even more preferably $0 \leq d \leq 0.3$. It is also acceptable not to include calcium in the catalyst for reforming.

The total amount (c+d) of the magnesium content (c) and the calcium content (d) is determined by the balance with the M content (a) and the cobalt content (b). Provided that (c+d) are within the limits described above, then an excellent effect is obtained for the reforming reaction at any ratio. However, although the deposition of the carbonaceous matters can be sufficiently suppressed if the contents of calcium (d) and M (a) are large, catalytic activity is reduced as compared to the case where there is much content of magnesium (c). Therefore, when preparing a more highly reactive catalyst, it is preferable to fix the calcium content (c) at less than 0.5, and the M content at less than 0.1.

The MgO and CaO in the mixed oxide employed in the present invention have rock salt type crystal structure and a portion of each of the Mg and Ca atoms positioned in this lattice is substituted with cobalt and M. Therefore, the mixed oxide employed here is not a mixture of separate oxides of M, cobalt, magnesium, and calcium, but a type of solid solution.

In the present invention, the cobalt and M exist in a highly dispersed state in this mixed oxide.

"Dispersion" as employed in the present invention is as usually defined in the catalyst preparation field. For example, as set forth in "Shokubai Koza, Vol. 5, Catalyst Design", p. 141 (Shokubai Gakkaihen, Kodanshakan), dispersion is defined as the ratio of the number of atoms exposed on the catalyst surface with respect to the total number of atoms of the supported metal. In other words, "high dispersion" refers to a state in which this ratio is high.

To explain this concretely for the present invention using the schematic of FIG. 1, innumerable spherical microparticles 2 which form the center of activity are present on the surface of a catalyst 1 comprising of a mixed oxide. Following the activation (reduction) treatment described below, these microparticles 2 consist of the cobalt and M metal elements, and the compounds thereof.

The dispersion ratio may be designated as B/A, where A is the number of atoms of the cobalt and M metal elements, and the compounds of cobalt and M, and B is the number of atoms from among these that are exposed on the surface of microparticle 2.

It is believed that the atoms exposed on the surface of microparticle 2 participate in the catalyst reaction. Moreover, there are many atoms exposed on the surface in a catalyst in which the dispersion ratio is near 1. For this reason, it is thought that the center of activity is increased in a catalyst in which the dispersion ratio is near 1, resulting in high reactivity.

In addition, the majority of the atoms in microparticle 2 will be exposed on the surface of catalyst 1, with the dispersion ratio approaching 1, if the particle diameter of microparticle 2 becomes small as possible. Accordingly, the diameter of microparticle 2 may be viewed to be an index expressing the dispersion ratio.

In the present invention's catalyst, the diameter of microparticle 2 is less than 3.5 nm, below the limit of measurement for various methods such as X-ray diffraction determination, for example. For this reason, the present invention's catalyst may be deemed to be in a highly dispersed state, with a high dispersion ratio. Accordingly, the number of cobalt and M atoms participating in the reforming reaction increases, resulting in high reactivity, with the stoichiometrical reaction progress. Thus, the deposition of carbonaceous matters (carbon) during the reforming reaction is prevented.

Any method is acceptable for preparing a reforming catalyst of this type, provided that it renders cobalt and M into a highly dispersed state. Particularly preferred methods may be cited, including impregnation supporting method, coprecipitation, sol-gel method (hydrolysis method), and homogeneous precipitation. In addition, the catalyst for reforming may also be prepared using the preparation method disclosed in Japanese Patent Application, First Publication No. Hei 8-131835 previously submitted by the current applicants.

For example, when using a coprecipitation method to prepare the catalyst for reforming, water soluble salts of cobalt, magnesium, calcium, group VIA elements, group VIIA elements, group VIII transition elements excluding cobalt, group IB elements, group IIB elements, group IVB elements, and lanthanoid elements are dissolved in water, to form an aqueous solution. Organic salts such as acetate and inorganic salts such as nitrate may be cited as examples of water soluble salts. A precipitate is generated by adding a precipitation reagent to this aqueous solution while stirring at 293~393K. In order to highly disperse the catalyst components, it is preferable to stir when generating the precipitate, and to complete formation of the precipitate by continuing to stir for 10 minutes or more following the formation.

Sodium and/or potassium carbonate, hydrogen carbonate, oxalate, or hydroxide are preferred as the precipitation reagent. Ammonia carbonate, ammonia hydroxide, ammonia (aqueous ammonia) and the like may also be used as the precipitation reagent.

The pH increases with the addition of the precipitation reagent, and a compound comprising of the above components precipitates in the form of a thermally decomposable hydroxide. The final pH of the mixture is preferably 6 or more, with a pH in the range of 8~11 being even more desirable. When the precipitate forms, it is subjected to filtering, and then repeated washing using water or an aqueous solution of ammonia carbonate. This is then dried at a temperature of 373K or more. Next, the dried precipitate is calcinated for 20 hours at 773~1773K in air to decompose the thermally decomposable hydroxide, thereby obtaining the targeted catalyst for reforming.

The thus-obtained catalyst is crushed, and may be employed as a powder. However, it is also acceptable to employ the catalyst molded in tablet form by a compression molding machine as needed. It is also acceptable to employ these catalysts in combination with quartz sand, alumina, magnesia, calcium oxide or other additives.

A process for producing synthetic gas employing this type of catalyst for reforming shall now be explained.

First, an activating treatment of the catalyst for reforming is performed. This activating treatment is carried out by heating the catalyst at 773~1273K, preferably 873~1273K, and more preferably 923~1273K, in the presence of a reducing gas such as hydrogen gas for about 1~120 minutes. The reducing gas may be diluted with an inert gas such as nitrogen gas. The activating treatment may be carried out in a reactor in which the reforming reaction is performed.

As a result of this activating treatment, microparticles 2 on the surface of catalyst 1 in FIG. 1 are reduced, becoming cobalt or M metal elements, or compounds thereof, and thereby enhancing the catalytic activity.

In the conventional cobalt oxide type catalyst, the activating treatments were all carried out at less than 773K. In contrast, the activating treatment in the present invention is carried out at a higher temperature than in the case of the conventional cobalt oxide type catalyst. This type of activating treatment at high temperature can contribute to higher dispersion of cobalt and M as described above.

Natural gas, petroleum gas, naphtha, heavy oil, crude oil, or hydrocarbons obtained from coal, tar sand or the like may be employed as the hydrocarbon that serves as the source material for the synthetic gas. The hydrocarbon employed is not particularly limited, provided that hydrocarbon such as methane is included as a portion thereof. It is also acceptable to mix two or more hydrocarbons.

Water (steam), carbon dioxide, oxygen, air or the like may be employed as the reforming agent, with mixtures of two or more of these also being acceptable.

When the supply rate of the hydrocarbon and reforming agent during the reaction is expressed as a molar ratio in which the number of carbon atoms in the hydrocarbon is set as the standard, typically, reforming agent/carbon ratio is taken as 0.3~100, preferably 0.3~10, and even more preferably, 0.5~3. In this invention, it is not necessary to supply a large excess of the reforming agent. An inert gas such as nitrogen may be present as a diluent in the gas mixture of the hydrocarbon and the reforming agent.

With regard to the specific reaction, the feed-stock gas comprising of the hydrocarbon and the reforming agent is supplied to a reactor filled with the above-described reforming catalyst, and the reaction is carried out at a temperature of 773~1273K, preferably 873~1273K and even more preferably 923~1273K, at a pressure of 0.1~10 MPa, preferably 0.1~5 MPa, and even more preferably 0.1~3 MPa.

The gas hourly space velocity (GHSV: the value obtained when the supply rate of the feed-stock gas is divided by the quantity of catalyst calculated as a volume) is 500~200000 $h^{-1}$, preferably 1000~100000$h^{-1}$, and even more preferably 1000~70000$h^{-1}$. The various types of reactors conventionally known may be optionally employed, including a fixed bed, moving bed, fluidized bed, or the like.

This type of catalyst for reforming is the mixed oxide of CoO and MOx with MgO or MgO/CaO. Wherein cobalt and M are highly dispersed. Therefore, the catalyst for reforming becomes highly active, so that it is possible to suppress deposition of the carbonaceous matters (carbon) even when the stoichiometric equivalent, or an amount near the stoichiometric equivalent, of the hydrocarbon such as methane and the reforming agent such as steam are reacted. As a result, the synthetic gas can be produced with high efficiency. For this reason, when this type of catalyst for reforming is employed, it is not necessary to supply a large excess of the reforming agent such as steam. Thus, the reforming agent is not wasted, and the synthetic gas can be produced at low cost.

In addition, the catalyst is not contaminated with carbonaceous matters, so that deterioration in catalytic activity over time can be prevented, thereby extending the life of the catalyst.

Embodiments

The actions and effects of the present invention will now be clarified using specific examples. Note, however, that the invention is not limited thereto.

EXAMPLE 1

(1) Catalyst Preparation 3.52 g of cobalt nitrate hexahydrate, 58.3 g of magnesium nitrate hexahydrate, and 0.695 g of manganese nitrate hexahydrate were dissolved in 250 ml of water. Next, 121 ml of 2 mol/L aqueous potassium carbonate was added to the mixture, to generate a precipitate comprising of the three components of cobalt, magnesium, and manganese. The precipitate was filtered and washed, after which it was dried in air at 393K for 12 hours or more. Calcination in air at 1223K for 20 hours was then performed, to obtain a 1 mol % manganese-5 mol % cobalt-magnesium mixed oxide.

(2) Reaction Test

The reaction was carried out using a high pressure flow type fixed bed reactor. An activating treatment was performed by filling an alumina reaction tube of inner diameter 4 mm with 0.2 g of the above-described catalyst molded to 250~500 $\mu$, and maintaining it for 60 minutes at 1173K in a hydrogen gas flow. Reaction tests were performed under the following conditions. The reaction products obtained by the above-described operations were introduced into a gas chromatograph and analyzed. The methane conversion values at one hour after the start of the reaction are shown in Table 1. The reaction was continued under these conditions, and an elemental analysis of the catalyst taken out after 100 hours elapse was performed. The results of measurements of the amount of carbonaceous matters on the catalyst are shown in Table 1.

Reaction Conditions reaction temperature: 1113K reaction pressure: 2MPa reforming gas: $H_2O/CH_4$ mole ratio=1 or $CO_2/CH_4$ mole ratio=1

GHSV=5,000 $h^{-1}$ (W/F=3.85 g-cat.h.mol$^{-1}$)

total gas supply rate: 19.4 ml/min catalyst quantity: 0.2 g

EXAMPLE 2

(1) Catalyst Preparation

A 1 mol % rhodium-5 mol % cobalt-magnesium mixed oxide was obtained in the same manner as in Example 1, with the exception that 0.699 g of rhodium nitrate was employed in place of the 0.695 g of manganese nitrate hexahydrate.

(2) Reaction Test

Reaction tests were carried out under the same conditions as in Example 1. The methane conversion value at one hour after the start of the reaction, and the amount of carbonaceous matters on catalyst removed after 100 hours of reaction are shown in Table 1.

EXAMPLE 3

(1) Catalyst Preparation

A 1 mol % ruthenium-5 mol % cobalt-magnesium mixed oxide was obtained in the same manner as in Example 1, with the exception that 0.964 g of tri-acetylacetonate ruthenium was employed in place of the 0.695 g of manganese nitrate hexahydrate.

(2) Reaction Test

Reaction tests were carried out under the same conditions as in Example 1. The methane conversion value at one hour after the start of the reaction, and the amount of carbonaceous matters on catalyst removed after 100 hours of reaction are shown in Table 1.

EXAMPLE 4

(1) Catalyst Preparation

A 1 mol % platinum-5 mol % cobalt-magnesium mixed oxide was obtained in the same manner as in Example 1, with the exception that 0.952 g of bis-acetylacetonate platinum was employed in place of the 0.695 g of manganese nitrate hexahydrate.

(2) Reaction Test

Reaction tests were carried out under the same conditions as in Example 1. The methane conversion value at one hour after the start of the reaction, and the amount of carbonaceous matters on catalyst removed after 100 hours of reaction are shown in Table 1.

EXAMPLE 5

(1) Catalyst Preparation

A 1 mol % palladium-5 mol % cobalt-magnesium mixed oxide was obtained in the same manner as in Example 1, with the exception that 0.558 g of palladium nitrate was employed in place of the 0.695 g of manganese nitrate hexahydrate.

(2) Reaction Test

Reaction tests were carried out under the same conditions as in Example 1. The methane conversion value at one hour after the start of the reaction, and the amount of carbonaceous matters on catalyst removed after 100 hours of reaction are shown in Table 1.

EXAMPLE 6

(1) Catalyst Preparation

A 1 mol % zinc-5 mol % cobalt-magnesium mixed oxide was obtained in the same manner as in Example 1, with the exception that 0.720 g of zinc nitrate hexahydrate was employed in place of the 0.695 g of manganese nitrate hexahydrate.

(2) Reaction Test

Reaction tests were carried out under the same conditions as in Example 1. The methane conversion value at one hour after the start of the reaction, and the amount of carbonaceous matters on catalyst removed after 100 hours of reaction are shown in Table 1.

EXAMPLE 7

(1) Catalyst Preparation

A 1 mol % lead-5 mol % cobalt-magnesium mixed oxide was obtained in the same manner as in Example 1, with the exception that 0.673 g of lead chloride was employed in place of the 0.695 g of manganese nitrate hexahydrate.

(2) Reaction Test

Reaction tests were carried out under the same conditions as in Example 1. The methane conversion value at one hour after the start of the reaction, and the amount of carbonaceous matters on catalyst removed after 100 hours of reaction are shown in Table 1.

EXAMPLE 8

(1) Catalyst Preparation

A 1 mol % lanthanum-5 mol % cobalt-magnesium mixed oxide was obtained in the same manner as in Example 1, with the exception that 1.05 g of lanthanum nitrate hexahydrate was employed in place of the 0.695 g of manganese nitrate hexahydrate.

(2) Reaction Test

Reaction tests were carried out under the same conditions as in Example 1. The methane conversion value at one hour after the start of the reaction, and the amount of carbonaceous matters on catalyst removed after 100 hours of reaction are shown in Table 1.

EXAMPLE 9

(1) Catalyst Preparation

A 1 mol % cerium-5 mol % cobalt-magnesium mixed oxide was obtained in the same manner as in Example 1, with the exception that 0.790 g of cerium (III) nitrate hexahydrate was employed in place of the 0.695 g of manganese nitrate hexahydrate.

(2) Reaction Test

Reaction tests were carried out under the same conditions as in Example 1. The methane conversion value at one hour after the start of the reaction, and the amount of carbonaceous matters on catalyst removed after 100 hours of reaction are shown in Table 1.

COMPARATIVE EXAMPLE 1

(1) Catalyst Preparation

A 5 mol % cobalt-magnesium mixed oxide was obtained in the same manner as Example 1, with the exception that 59.0 g of magnesium nitrate hexahydrate was employed, and 0.695 g of manganese nitrate hexahydrate was not used.

(2) Reaction Test

Reaction tests were carried out under the same conditions as in Example 1. The methane conversion value at one hour after the start of the reaction, and the amount of carbonaceous matters on catalyst removed after 100 hours of reaction are shown in Table 1.

TABLE 1

| Example And Comp. Example | Methane conversion (%) after reaction for one hour | | Carbonaceous matters (wt %) after reaction for 100 hours | |
|---|---|---|---|---|
| | reforming with $CH_4$/ $H_2O$ | Reforming with $CH_4$/ $CO_2$ | Reforming with $CH_4$/ $H_2O$ | Reforming with $CH_4$/ $CO_2$ |
| Ex. 1 | 47.90 | 55.60 | 0.18 | 0.25 |
| Ex. 2 | 47.75 | 55.31 | 0.32 | 0.40 |
| Ex. 3 | 47.63 | 55.01 | 0.38 | 0.49 |
| Ex. 4 | 48.01 | 55.65 | 0.27 | 0.35 |
| Ex. 5 | 47.94 | 54.39 | 0.42 | 0.60 |
| Ex. 6 | 46.62 | 54.74 | 0.70 | 0.89 |
| Ex. 7 | 45.98 | 50.73 | 0.88 | 1.03 |
| Ex. 8 | 46.50 | 49.16 | 1.41 | 1.65 |
| Ex. 9 | 47.03 | 53.50 | 1.35 | 1.59 |
| Comp. Ex. 1 | 46.26 | 54.61 | 1.53 | 1.72 |

What is claimed:

1. A process for producing a synthetic gas from hydrocarbon and a reforming agent by employing a catalyst for reforming, the catalyst comprising a mixed oxide having a composition expressed by;

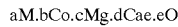

aM.bCo.cMg.dCae.eO in which a, b, c, d, and e are molar fractions satisfying: a+b+c+d+=1; $0.0001 \leq a \leq 0.10$; $0.0001 \leq b \leq 0.20$; $0.70 \leq (c+d) \leq 0.9998$; $0 < c \leq 0.9998$; $0 \leq d < 0.9998$; and e=the molar fraction of oxygen necessary to maintain an electric charge balance; and M is at least one element selected from the group consisting of group VIA elements, group VIIA elements, group VIII transition elements excluding Co, group IB elements, group IIB elements, group IVB elements, and lanthanide elements in the periodic table, wherein M and Co are highly dispersed in said mixed oxide.

2. A process for producing a synthetic gas from hydrocarbon and a reforming agent by employing said catalyst for reforming according to claim 1, wherein M is at least one element selected from the group consisting of manganese, rhodium, ruthenium, platinum, palladium, zinc, lead, lanthanum, and cerium.

3. A process for producing a synthetic gas from hydrocarbon and a reforming agent by employing a catalyst for reforming comprising a mixed oxide having a composition expressed by:

$aM.bCo.cMg.dCa.eO$ in which a, b, c, d, and e are molar fractions satisfying: $a+b+c+d+=1$; $0.0001 \leq a \leq 0.05$; $0.0001 \leq b \leq 0.15$; $0.85 \leq (c+d) \leq 0.9998$; $0.35 \leq c \leq 0.9998$; $0 \leq d \leq 0.5$; and e=the molar fraction of oxygen necessary to maintain an electric charge balance; arid M is at least one element selected from the group consisting of group VIA elements, group VIIA elements, group VIII transition elements excluding Co, group IB elements, group IIB elements, group IVB elements, and lanthanide elements in the periodic table, wherein M and Co are highly dispersed in said mixed oxide.

4. A process for producing a synthetic gas from hydrocarbon and a reforming agent by employing said catalyst for reforming according to claim 3, wherein M is at least one element selected from the group consisting of manganese, rhodium, ruthenium, platinum, palladium, zinc, lead, lanthanum, and cerium.

5. A process for producing a synthetic gas from hydrocarbon and a reforming agent by employing a catalyst for reforming comprising a mixed oxide having a composition expressed by:

$aM.bCo.cMg.dCae.eO$ in which a, b, c, d, and e are molar fractions satisfying: $a+b+c+d+=1$; $0.0001 \leq a \leq 0.03$; $0.0001 \leq b \leq 0.10$; $0.90 \leq (c+d) \leq 0.998$; $06 \leq c \leq 0.9998$; $0 \leq d < 0.3$; and 3=the molar fraction of oxygen necessary to maintain an electric charge balance; and M is at least one element selected from the group consisting of group VIA elements, group VIIA elements, group VIII transition elements excluding Co, group IB elements, group IIB elements, group IVB elements, and lanthanide elements in the periodic table, wherein M and Co are highly dispersed in said mixed oxide.

6. A process for producing a synthetic gas from hydrocarbon and a reforming agent by employing said catalyst for reforming according to claim 5, wherein M is at least one element selected from the group consisting of manganese, rhodium, ruthenium, platinum, palladium, zinc, lead, lanthanum, and cerium.

* * * * *

UNITED STATES PATENT AND TRADEMARK OFFICE
CERTIFICATE OF CORRECTION

PATENT NO. : 6,726,853 B2
DATED : April 27, 2004
INVENTOR(S) : Hideo Okado et al.

It is certified that error appears in the above-identified patent and that said Letters Patent is hereby corrected as shown below:

<u>Column 10,</u>
Line 22, after "cerium" insert:
-- 7. The process for producing the synthetic gas according to claim 1, wherein the supply ratio of the hydrocarbon and the reforming agent is reforming agent/carbon ratio=0.3~100.
8. The process for producing the synthetic gas according to claim 3, wherein the supply ratio of the hydrocarbon and the reforming agent is reforming agent/carbon ratio=0.3~100.
9. The process for producing the synthetic gas according to claim 5, wherein the supply ratio of the hydrocarbon and the reforming agent is reforming agent/carbon ratio=0.3~100.
10. The process for producing the synthetic gas according to claim 2, wherein the supply ratio of the hydrocarbon and the reforming agent is reforming agent/carbon ratio=0.3~100.
11. The process for producing the synthetic gas according to claim 4, wherein the supply ratio of the hydrocarbon and the reforming agent is reforming agent/carbon ratio=0.3~100.
12. The process for producing the synthetic gas according to claim 6, wherein the supply ratio of the hydrocarbon and the reforming agent is reforming agent/carbon ratio=0.3~100.
13. The process for producing the synthetic gas according to claim 7, wherein the supply ratio of the hydrocarbon and the reforming agent is reforming agent/carbon ratio=0.3~10.
14. The process for producing the synthetic gas according to claim 7, wherein the supply ratio of the hydrocarbon and the reforming agent is reforming agent/carbon ratio=0.5~3. --

Signed and Sealed this

Twenty-third Day of August, 2005

JON W. DUDAS
*Director of the United States Patent and Trademark Office*